United States Patent [19]
Kishino et al.

[11] 3,894,123
[45] July 8, 1975

[54] O-ALKYL-S,S-di-(SUBSTITUTED-ALKYL)-PHOSPHORO-DITHIOLATES

[75] Inventors: Shigeo Kishino, Tokyo; Akio Kudamatsu; Kozo Shiokawa, both of Kanagawa, all of Japan

[73] Assignee: Bayer Aktiengesellschaft, Leverkusen, Germany

[22] Filed: Dec. 16, 1971

[21] Appl. No.: 208,938

[30] Foreign Application Priority Data
Dec. 29, 1970  Japan.............................. 45-129545

[52] U.S. Cl....... 260/941; 260/247.1 B; 260/293.85; 260/943; 260/948; 260/949; 424/198; 424/200; 424/203
[51] Int. Cl............................. C07f 9/16; A01n 9/36
[58] Field of Search ............ 260/948, 941, 949, 943

[56] References Cited
UNITED STATES PATENTS

| | | | |
|---|---|---|---|
| 3,636,144 | 1/1972 | Tsuchiya et al...................... | 260/948 |
| 3,660,543 | 5/1972 | Mueller et al. ..................... | 260/948 |
| 3,706,822 | 12/1972 | Caldwell.............................. | 260/948 |
| 3,712,937 | 1/1973 | Schrader et al..................... | 260/948 |

*Primary Examiner*—Donald G. Daus
*Assistant Examiner*—Jose Tovar
*Attorney, Agent, or Firm*—Burgess, Dinklage & Sprung

[57] ABSTRACT

O-alkyl-S,S-di-(substituted-alkyl)-phosphorodithiolates of the general formula

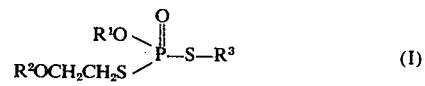 (I)

in which
$R^1$ is methyl or ethyl, $R^2$ is lower alkyl, and
$R^3$ is alkyl substituted by alkylthio; alkylsulfinyl; alkoxycarbonyl; optionally halo-substituted phenyl- or benzyl-thio or -sulfinyl; or carbamyl wherein the nitrogen atom carries at least one lower alkyl, cyclohexyl or benzyl or is part of a heterocyclic ring, which possess insecticidal, acaricidal and nematocidal properties.

8 Claims, No Drawings

O-ALKYL-S,S-di-(SUBSTITUTED-ALKYL)-PHOSPHORO-DITHIOLATES

The present invention relates to and has for its objects the provision of particular new O-alkyl-S,S-di-(substituted-alkyl)-phosphorodithiolates, i.e. O-methyl or ethyl S-(lower alkoxy-ethyl)-S-(substituted-lower alkyl)-phosphorodithiolates, which possess insecticidal, acaricidal and nematocidal properties, active compositions in the form of mixtures of such compounds with solid and liquid dispersible carrier vehicles, and methods for producing such compounds and for using such compounds in a new way especially for combating pests, e.g. insects, acarids and nematodes, with other and further objects becoming apparent from a study of the within specification and accompanying examples.

In the specification of Dutch Pat. No. 67/17383 there is disclosed the compound of the formula:

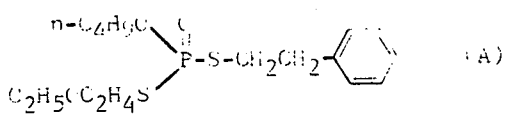

which has insecticidal and fungicidal activities..

The present invention provides, as new compounds, the phosphoric acid esters of the general formula

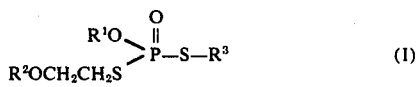

in which
R$^1$ is methyl or ethyl, R$^2$ is lower alkyl, and
R$^3$ is alkyl substituted by alkylthio; alkylsulfinyl; alkoxycarbonyl; optionally halo-substituted phenyl- or benzyl-thio or -sulfinyl; or carbamyl wherein the nitrogen atom carries at least one lower alkyl, cyclohexyl or benzyl or is part of a heterocyclic ring.

Preferably R$^1$ is methyl or ethyl and R$^2$ is a lower alkyl radical of 1 to 4 carbon atoms. Preferably R$^3$ is substituted lower alkyl, especially methyl or ethyl, alkyl groups when present in the various substituents being lower alkyl.

These new compounds have been found to possess excellent insecticidal, acaricidal and nematocidal properties.

The present invention also provides a process for the preparation of compounds of the formula (I) above, in which a dithiophosphate of the general formula

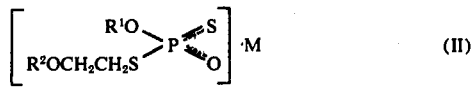

is reacted with a halide of the general formula

in which formulas
M is a metal equivalent, preferably in alkali metal, or ammonium,
Hal is halogen, preferably bromine or chlorine, and R$^1$, R$^2$ and R$^3$ have the meanings stated above.

The reaction of the process of this invention may be expressed by the following equation:

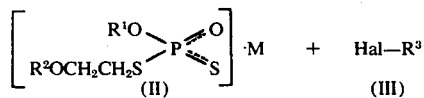

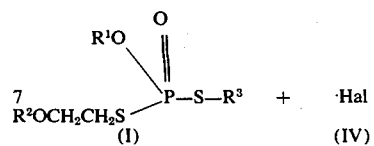

It will be seen from this equation that the reactants are advantageously employed in substantially equimolar amounts.

Examples of the dithiophosphates of the general formula (II) are the potassium, sodium and ammonium salts of O-methyl-S-(2-ethoxyethyl)-dithiophosphoric acid, O-ethyl-S-(2-methoxyethyl)-dithiophosphoric acid, O-ethyl-S-(2-ethoxyethyl)-dithiophosphoric acid, O-ethyl-S-(2-isopropoxyethyl)-dithiophosphoric acid and O-ethyl-S-(2-n-butoxyethyl)-dithiophosphoric acid.

As examples of the halides of the general formula (III) there may be mentioned ethylthiomethyl bromide, 2-ethyl-thioethyl bromide, 2-(n-butylthio)ethyl bromide, 1-methyl-2-(ethylthio)ethyl bromide, 2-ethylsulfinylethyl bromide, phenylthiomethyl bromide, 4-chlorophenylthiomethyl bromide, benzylthiomethyl bromide, 4-chlorobenzylthiomethyl bromide, 2-phenylthioethyl bromide, 2-(4-chlorophenylthio) ethyl bromide, 2-(4-chlorophenylsulfinyl)ethyl bromide, 2-benzyl-thioethyl bromide, ethoxycarbonylmethyl bromide, N-methyl-aminocarbonylmethyl bromide, N-isopropylaminocarbonylmethyl bromide, N-cyclohexylaminocarbonylmethyl bromide, N-benzylaminocarbonylmethyl bromide, N,N-dimethylaminocarbonylmethyl bromide, N,N-diethylaminocarbonylmethyl bromide, N,N-di-isopropylaminocarbonylmethyl bromide, N,N-di-n-butylaminocarbonylmethyl bromide, 1-piperidinocarbonylmethyl bromide, 1-morpholinocarbonylmethyl bromide and the corresponding chlorides.

The reaction is preferably carried out in a solvent or diluent. For this purpose, any inert solvent or diluent may be used, especially water; an optionally chlorinated aliphatic, alicyclic or aromatic hydrocarbon such as hexane, cyclohexane, petroleum ether, ligroin, benzene, toluene, xylene, methylene chloride, chloroform, carbon tetrachloride, mono, di- or tri-chloroethylene or chlorobenzene; an ether such as diethyl ether, methylethyl ether, di-isopropyl ether, di-butyl ether, ethylene oxide, dioxane or tetrahydrofurane; a ketone such as acetone, methylethyl ketone, methyl-isopropyl ketone, or methyl-isobutyl ketone; an alcohol such as methanol, isopropanol, butanol or ethylene glycol; a nitrile such as acetonitrile, propionitrile or acrylonitrile; an ester such as ethyl acetate or amyl acetate; an acid amide such as dimethyl formamide or dimethyl acetamide; or a sulfone or sulfoxide such as dimethyl sulfoxide or sulfolane.

The reaction may be effected at temperatures within a fairly broad range, but generally the reaction is carried out at from about −20°C to the boiling point of the reaction mixture, preferably at from about 0° to 100°C or to the boiling point of the reaction mixture, whichever is the lower.

It is preferable to carry out the reaction under atmospheric pressure, although it is possible to conduct the reaction under reduced or elevated pressure.

The compounds of this invention, as implied above, exhibit excellent biological activities against various harmful insects, mites and nematodes; surprisingly, in this respect, the compounds of this invention appear to be superior to the known compound of the formula (I) given above and to other known compounds having similar directions of activity.

Furthermore, the active compounds of this invention exhibit only a very low toxicity towards warm-blooded animals and show no phytotoxicity towards cultivated plants. They are characterized by an activity that sets in quickly and that is long-lasting. Accordingly, they can be used for controlling harmful insects, such as biting and sucking insects, as well as mites and nematodes, especially in agriculture.

For instance, the active compounds of this invention are effective for controlling insects belonging to the Coleoptera such as the rice weevil *Sitophilus oryzae*, flour beetle *Tribolium castaneum*, twenty-eight-spotted lady beetle *Epilachna vigintioctopunctata*, barley wireworm *Agriotes fusicicollis* and soy-bean beetle *Anomala rufocuprea*; insects belonging to the Lepidoptera such as the gypsy moth *Lymantria dispar*, tent caterpillar *Malacosoma neustria testacea*, common cabbageworm *Pieris rapae crucivora*, cotton leaf worm or tobacco cutworm *Prodenia litura*, rice stem borer *Chilo suppressalis*, smaller tea tortrix *Adoxophyes orana* and almond moth *Ephestia cautella*; insects belonging to the Hemiptera such as the green rice leaf-hopper *Nephotettix cincticeps*, brown planthopper *Nilaparvata lugens*, comstock mealybug *Pseudococcus comstocki*, arrowhead scale *Unaspis yanonensis*, green peach aphid *Myzus persicae*, apple aphid *Aphis pomi* and cabbage aphid *Brevi coryne brassicae*; insects belonging to the Orthoptera such as the German cockroach *Blattella germanica*, American cockroach *Periplaneta americana* and African mole cricket *Gryllotalpa africana*; insects belonging to the Isoptera such as the Japanese termite *Leucotermes speratus*; insects belonging to the Diptera such as the house fly *Musca domestica vicina*, yellow-fever mosquito *Aedes aegypti*, seed-corn maggot *Hylemya platura*, northern house mosquito *Culex pipiens*, Chinese malaria mosquito *Anopheles sinensis* and smaller house mosquito *Culex tritaeniorhynchus*; mites such as the two-spotted spider mite *Tetranychus telarius*, citrus red mite *Panonychus citri* and Japanese citrus rust mite *Aculus pelekassi*; and nematodes such as the southern root-knot nematode *Meloidogyne incognita*, rice white-tip nematode *Aphelenchoides besseyi* and soy-bean cyst nematode *Heterodera glicines*.

The active compounds according to the instant invention can be utilized, if desired, in the form of the usual formulations or compositions with conventional inert (i.e. plant compatible or herbicidally inert) pesticide diluents or extenders, i.e. diluents, carriers or extenders of the type usable in conventional pesticide formulations or compositions, e.g. conventional pesticide dispersible carrier vehicles such as gases, solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: aerosol propellants which are gaseous at normal temperatures and pressures, such as freon; inert dispersible liquid diluent carriers, including inert organic solvents, such as aromatic hydrocarbons (e.g. benzene, toluene, xylene, alkyl naphthalenes, etc.), halogenated, especially chlorinated, aromatic hydrocarbons (e.g. chlorobenzenes, etc.), cyclohexane, paraffins (e.g. petroleum fractions), chlorinated aliphatic hydrocarbons (e.g. methylene chloride, chloroethylenes, etc.), alcohols (e.g. methanol, ethanol, propanol, butanol, glycol, etc.) as well as their ethers and esters, amines (e.g. ethanolamine, etc.), ether-alcohols (e.g. glycol monomethyl ether, etc.), amides (e.g. dimethyl formamide, etc.), sulfoxides (e.g. dimethyl sulfoxide, etc.), acetonitrile, ketones (e.g. acetone, methyl ethyl ketone, methyl isobutyl ketone, cyclohexanone, etc.), and/or water; as well as inert dispersible finely divided solid carriers, such as ground natural minerals (e.g. kaolins, clays, alumina, silica, chalk, i.e. calcium carbonate, talc, attapulgite, montomorillonite, kieselguhr, etc.) and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfates, alkyl sulfonates, aryl sulfonates, etc., and especially alkyl arylpolyglycol ethers, magnesium stearate, sodium oleate, etc.); and/or dispersing agents, such as lignin, sulfite waste liquors, methyl cellulose, etc.

Possible adjuvants include organic matter, stabilizers, adhesive agents, for example agricultural soap, calcium caseinate, sodium alginate, polyvinyl alcohol, detergents, coumarone (or indene) resins or polyvinyl butyl ether, combustible materials (for fumigants), for example zinc dust or dicyandiamide, oxygen-yielding substances, for example perchlorates, nitrites or dichromates, phytotoxicity-reducing substances, for example zinc sulfate, ferrous chloride or copper nitrate, substances for prolonging the biological effect, for example chlorinated terphenyls, emulsion-stabilizing substances, for example casein, gum tragacanth, carboxymethyl cellulose and polyvinyl alcohol, and synergistic agents.

The compounds of the present invention can, if desired, be applied with other agricultural chemicals such as fertilizers, or with insecticides, acaricides, nematocides, antiviral agents, herbicides, plant-growth regulators and attractants which classes of materials include organic phosphorus acid esters, carbamates, dithio-(or thiol-)carbamates, chlorinated organic compounds, dinitro compounds, organosulfur or organometal compounds, antibiotics, substituted diphenyl ethers, ureas and triazines.

Such active compounds may be employed alone or in the form of mixtures with one another and/or with such solid and/or liquid dispersible carrier vehicles and/or with other known compatible active agents in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplate those in which the active compound is present in an amount substantially between about 0.0001–20%, preferably 0.001–5%, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.0001–95%, and preferably 0.01–95%, by weight of the mixture.

The active compounds can also be used in accordance with the well known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mists form, for example by airplane crop spraying techniques. Only up to at most about a few liters/hectare are needed, and often amounts only up to about 3 to 1000 g/hectare, preferably 30 to 600 g/hectare, are sufficient. In this process it is possible to use highly concentrated liquid compositions with said liquid carrier vehicles containing from about 20 to about 95% by weight of the active compound or even the 100% active substance alone, e.g. about 20–100% by weight of the active compound.

Furthermore, the present invention contemplates methods of selectively killing, combating or controlling pests, e.g. insects, acarids and nematodes which comprises applying to at least one of correspondingly (a) such insects, (b) such acarids, (c) such nematodes, and (d) the corresponding habitat thereof, i.e. the locus to be protected, a correspondingly combative or toxic amount, i.e. an insecticidally, acaricidally or nematocidally effective amount of the particular active compound of the invention alone or together with a carrier vehicle as noted above. The instant formulations or compositions are applied in the usual manner, for instance by spraying, misting, atomizing, vaporizing, scattering, dusting, watering, squirting, pouring, fumigating, soil application such as mixing, sprinkling and irrigating, surface application such as painting, banding and dressing, dipping, baiting, and the like.

It will be realized, of course, that the concentration of the particular active compound utilized in admixture with the carrier vehicle will depend upon the intended application. Therefore, in special cases it is possible to go above or below the aforementioned concentration ranges.

The unexpected superiority and outstanding activity of the particular new compounds of the present invention are illustrated, without limitation, by the following examples:

EXAMPLE 1

12 g of 2-ethylthioethyl chloride were added dropwise at room temperature to a solution of 28 g of potassium O-ethyl-S-(2-isopropoxyethyl)-dithiophosphate in 100 ml of methylethyl ketone. The mixture was gradually heated with agitation, and the reaction was effected at 60°–70°C for 2 hours. After completion of the reaction, the methylethyl ketone was distilled off, and the residue was taken up in benzene, washed with water and 1% potassium carbonate solution, and dried over anhydrous sodium sulfate. Removal of the benzene gave 27 g, as a colorless oil, of O-ethyl-S-(2-isopropoxyethyl)-S-(2-ethylthioethyl)-phosphorodithiolate of the formula:

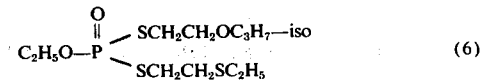

(6)

The product was characterized by a boiling point of 150°–153°C under 0.1 mmHg and a refractive index $n_D^{20}$ of 1.5241. The compound is hereinafter identified as compound No. 6.

EXAMPLE 2

16 g of phenylthiomethyl chloride were added to a solution of 27 g of potassium O-ethyl-S-(2-ethoxyethyl)-dithiophosphate in 150 ml of acetonitrile, and the mixture was heated at 60°C for 2 hours with agitation.

The reaction mixture was cooled and then acetonitrile was distilled off. The residue was taken up in benzene, washed with water and 1% sodium carbonate solution, and dried over anhydrous sodium sulfate. Removal of the benzene gave 32 g, as a colorless oil, of O-ethyl-S-(2-ethoxyethyl)-S-(phenyl-thiomethyl)-phosphorodithiolate of the formula:

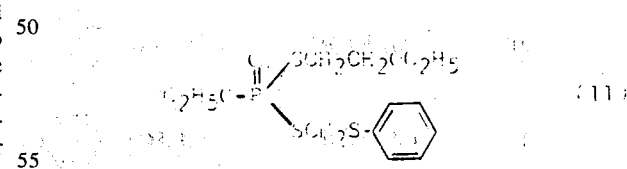

(11)

The product was characterized by a refractive index $n_D^{20}$ of 1.5835. The compound is hereinafter identified as compound No. 11.

EXAMPLE 3

The following compounds may be prepared by methods analogous to those of the above preparative Examples.

Table 1

$$\begin{array}{c}R^1O\\R^2OCH_2S\end{array}\!\!>\!\!\overset{\overset{O}{\|}}{P}\!-\!S\!-\!R^3$$

| Compound No. | R¹ | R² | R³ | Physical properties |
|---|---|---|---|---|
| 1 | $C_2H_5$ | $CH_3$ | $-CH_2SC_2H_5$ | b.p. 120–126°C/0.1mm Hg; $n_D^{20}$ 1.5338 |
| 2 | $C_2H_5$ | $C_2H_5$ | $-CH_2SC_2H_5$ | b.p. 136–140°C/0.2 mm Hg; $n_D^{20}$ 1.5311 |
| 3 | $CH_3$ | $C_2H_5$ | $-C_2H_4SC_2H_5$ | $n_D^{20}$ 1.5400 |
| 4 | $C_2H_5$ | $CH_3$ | $-C_2H_4SC_2H_5$ | b.p. 146–147°C/0.1 mm Hg; $n_D^{20}$ 1.5367 |
| 5 | $C_2H_5$ | $C_2H_5$ | $-C_2H_4SC_2H_5$ | b.p. 148–150°C/0.15mm Hg; $n_D^{20}$ 1.5303 |
| 7 | $C_2H_5$ | $C_4H_9\!-\!n$ | $-C_2H_4SC_2H_5$ | b.p. 154–158°C/0.1 mm Hg; $n_D^{20}$ 1.5210 |
| 8 | $C_2H_5$ | $C_2H_5$ | $-C_2H_4SC_4H_9\!-\!n$ | b.p. 138–140°C/0.1 mm Hg; $n_D^{20}$ 1.5214 |
| 9 | $C_2H_5$ | $C_2H_5$ | $-\overset{\overset{CH_3}{\|}}{C}HCH_2SC_2H_5$ | $n_D^{20}$ 1.5226 |
| 10 | $C_2H_5$ | $C_2H_5$ | $-C_2H_4\!-\!\overset{\overset{O}{\|}}{S}\!-\!C_2H_5$ | $n_D^{20}$ 1.5398 |
| 12 | $C_2H_5$ | $CH_3$ | $-CH_2S\!-\!\!\!\bigcirc\!\!\!-Cl$ | $n_D^{20}$ 1.5950 |
| 13 | $C_2H_5$ | $C_2H_5$ | $-CH_2S\!-\!\!\!\bigcirc\!\!\!-Cl$ | $n_D^{20}$ 1.5859 |
| 14 | $C_2H_5$ | $CH_3$ | $-C_2H_4S\!-\!\!\!\bigcirc$ | $n_D^{20}$ 1.5785 |
| 15 | $C_2H_5$ | $C_2H_5$ | $-C_2H_4S\!-\!\!\!\bigcirc$ | b.p. 158–160°C/0.1 mm Hg; $n_D^{20}$ 1.5729 |
| 16 | $C_2H_5$ | $C_3H_7\!-\!iso$ | $-C_2H_4S\!-\!\!\!\bigcirc$ | $n_D^{20}$ 1.5636 |
| 17 | $C_2H_5$ | $CH_3$ | $-C_2H_4S\!-\!\!\!\bigcirc\!\!\!-Cl$ | $n_D^{20}$ 1.5870 |
| 18 | $C_2H_5$ | $C_2H_5$ | $-C_2H_4S\!-\!\!\!\bigcirc\!\!\!-Cl$ | $n_D^{20}$ 1.5793 |
| 19 | $C_2H_5$ | $C_2H_5$ | $-C_2H_4\overset{\overset{O}{\|}}{S}\!-\!\!\!\bigcirc\!\!\!-Cl$ | $n_D^{20}$ 1.5788 |
| 20 | $C_2H_5$ | $C_2H_5$ | $-CH_2SCH_2\!-\!\!\!\bigcirc$ | $n_D^{20}$ 1.5771 |
| 21 | $C_2H_5$ | $C_2H_5$ | $-CH_2SCH_2\!-\!\!\!\bigcirc\!\!\!-Cl$ | $n_D^{20}$ 1.5830 |
| 22 | $C_2H_5$ | $C_2H_5$ | $-C_2H_4SCH_2\!-\!\!\!\bigcirc$ | $n_D^{20}$ 1.5691 |
| 23 | $C_2H_5$ | $C_2H_5$ | $-CH_2\overset{\overset{O}{\|}}{C}OC_2H_5$ | b.p. 140–142°C/0.07 mmHg; $n_D^{20}$ 1.5005 |
| 24 | $C_2H_5$ | $CH_3$ | $-CH_2\overset{\overset{O}{\|}}{C}NHCH_3$ | $n_D^{20}$ 1.5301 |
| 25 | $C_2H_5$ | $C_2H_5$ | $-CH_2\overset{\overset{O}{\|}}{C}NHCH_3$ | $n_D^{20}$ 1.5260 |
| 26 | $C_2H_5$ | $CH_3$ | $-CH_2\overset{\overset{O}{\|}}{C}NHC_3H_7\!-\!iso$ | $n_D^{20}$ 1.5162 |
| 27 | $C_2H_5$ | $C_2H_5$ | $-CH_2\overset{\overset{O}{\|}}{C}NHC_3H_7\!-\!iso$ | $n_D^{20}$ 1.5123 |

Table 1—Continued $$\begin{array}{c} R^1O \\ R^2OCH_2CH_2S \end{array} P \begin{array}{c} O \\ \| \\ -S-R^3 \end{array}$$

| Compound No. | $R^1$ | $R^2$ | $R^3$ | Physical properties |
|---|---|---|---|---|
| 28 | $C_2H_5$ | $C_2H_5$ | $-CH_2\overset{O}{\overset{\|}{C}}NH-\langle H \rangle$ | $n_D^{20}$ 1.5229 |
| 29 | $C_2H_5$ | $C_2H_5$ | $-CH_2\overset{O}{\overset{\|}{C}}NHCH_2-\langle \rangle$ | $n_D^{20}$ 1.5473 |
| 30 | $C_2H_5$ | $CH_3$ | $-CH_2\overset{O}{\overset{\|}{C}}N(CH_3)_2$ | $n_D^{20}$ 1.5364 |
| 31 | $C_2H_5$ | $C_2H_5$ | $-CH_2\overset{O}{\overset{\|}{C}}N(CH_3)_2$ | $n_D^{20}$ 1.5281 |
| 32 | $CH_3$ | $C_2H_5$ | $-CH_2\overset{O}{\overset{\|}{C}}N(C_2H_5)_2$ | $n_D^{20}$ 1.5213 |
| 33 | $C_2H_5$ | $CH_3$ | $-CH_2\overset{O}{\overset{\|}{C}}N(C_2H_5)_2$ | $n_D^{20}$ 1.5181 |
| 34 | $C_2H_5$ | $C_2H_5$ | $-CH_2\overset{O}{\overset{\|}{C}}N(C_2H_5)_2$ | $n_D^{20}$ 1.5170 |
| 35 | $C_2H_5$ | $C_3H_7$—iso | $-CH_2\overset{O}{\overset{\|}{C}}N(C_2H_5)_2$ | $n_D^{20}$ 1.5096 |
| 36 | $C_2H_5$ | $C_2H_5$ | $-CH_2\overset{O}{\overset{\|}{C}}N(C_3H_7\text{—iso})_2$ | $n_D^{20}$ 1.5139 |
| 37 | $C_2H_5$ | $C_2H_5$ | $-CH_2\overset{O}{\overset{\|}{C}}N(C_4H_9\text{—n})_2$ | $n_D^{20}$ 1.5045 |
| 38 | $C_2H_5$ | $C_2H_5$ | $-CH_2\overset{O}{\overset{\|}{C}}N\langle \rangle$ | $n_D^{20}$ 1.5394 |
| 39 | $C_2H_5$ | $C_2H_5$ | $-CH_2\overset{O}{\overset{\|}{C}}N\langle O \rangle$ | $n_D^{20}$ 1.5431 |

The following Examples illustrate the compositions according to the present invention. In these Examples, as in the subsequent test Examples, the compounds of this invention are identified by the numbers assigned to them in Examples 1 – 3 above.

EXAMPLE 4

15 parts of compound No. 5, 80 parts of a 1:5 mixture of diatomaceous earth and kaolin and 5 parts of an emulsifier, RUNNOX (a polyoxyethylene alkylaryl ether), were ground and mixed together to form wettable powder. It was diluted to 0.05% with water before being applied by spraying.

EXAMPLE 5

30 parts of compound No. 8, 30 parts of xylene, 30 parts of KAWAKAZOL (a high-boiling-point aromatic hydrocarbon) and 10 parts of an emulsifier, SORPOL (a polyoxyethylene alkylaryl ether) were mixed with stirring to form an emulsifiable liquor. It was diluted with water to 0.05% before being applied by spraying.

EXAMPLE 6

2 parts of compound No. 23 and 98 parts of a 1:3 mixture of talc and clay were ground and mixed together to form a dust. This was applied by scattering.

EXAMPLE 7

1.5 parts of compound No. 20, 2 parts of an organic phosphoric acid ester, 0.5 part of isopropyl hydrogen phosphate and 96 parts of a 1:3 mixture of talc and clay were ground and mixed together to form a dust. This was applied by scattering.

EXAMPLE 8

25 parts of water were added to a mixture of 10 parts of compound No. 15, 10 parts of bentonite, 78 parts of a 1:3 mixture of talc and clay and 2 parts of lignin sulfonate. The mixture was intimately blended and finely divided by means of an extruding granulator to obtain granules of 20–40 mesh, followed by drying at 40°–50°C. The resulting granules were applied by spraying.

EXAMPLE 9

95 parts of clay particles of a size distribution of 0.2–2 mm were put into a rotary mixer and a solution of 5 parts of compound No. 39 in an organic solvent was sprayed onto the particles being rotated, thereby wetting the particles homogeneously. They were then dried at 40°–50°C to form coated granules. The granules were applied by spraying.

EXAMPLE 10

0.5 parts of compound No. 31, 20 parts of "Velsicol" (a high boiling-point aromatic hydrocarbon) and 79.5 parts of "Deobase" (deodorized kerosene) were mixed with stirring to form an oil preparation. It was applied by spraying.

The pesticidal activity of the compounds of the present invention is illustrated in and by the following test Examples.

EXAMPLE 11

Test on effects against cotton leaf worm larvae:
Preparation of Sample Formulation Solvent: 3 parts by weight of dimethyl formamide
Emulsifier: 1 part by weight of alkylaryl polyglycol ether In order to prepare a suitable formulation of an active compound, one part by weight of the active compound was mixed with the above amount of the solvent containing the above amount of the emulsifier, and the mixture was diluted with water to form an aqueous formulation containing the active compound at a prescribed concentration.

Test Procedure

Sweet-potato leaves were dipped in a formulation of an emulsifiable liquor containing the active compound at the prescribed concentration, and they were then dried in air and placed in a 9 cm diameter Petri dish. Then 10 third-instar cotton leaf worm *Prodenia litura* larvae were put into the dish and the dish was kept in a thermostat chamber maintained at 28°C. After 24 hours had passed, the number of dead larvae was counted and the killing ratio was calculated. The results are shown in Table 2.

Table 2

| Compound No. | Killing Ratio (%) Active Ingredient Concentration | |
|---|---|---|
| | 300 ppm | 100 ppm |
| 2 | 100 | 90 |
| 3 | 100 | 70 |
| 4 | 100 | 70 |
| 5 | 100 | 100 |
| 6 | 100 | 100 |
| 7 | 100 | 100 |
| 8 | 100 | 100 |
| 9 | 100 | 90 |
| 10 | 100 | 60 |
| 11 | 100 | 100 |
| 12 | 100 | 90 |
| 13 | 100 | 100 |
| 14 | 100 | 100 |
| 15 | 100 | 100 |
| 16 | 100 | 100 |
| 17 | 100 | 100 |
| 18 | 100 | 100 |
| 19 | 100 | 50 |
| 20 | 100 | 100 |
| 21 | 100 | 100 |
| 22 | 100 | 100 |
| 23 | 100 | 70 |
| 26 | 100 | 100 |
| 27 | 100 | 100 |
| 28 | 100 | 70 |
| 29 | 100 | 60 |
| 30 | 100 | 70 |
| 31 | 100 | 100 |
| 33 | 100 | 100 |
| 34 | 100 | 60 |
| 35 | 100 | 90 |
| 36 | 100 | 70 |
| 37 | 100 | 100 |
| 38 | 100 | 90 |
| 39 | 100 | 100 |
| Comparison (I) | 10 | 0 |
| (II) | 0 | 0 |
| (III) | 20 | 0 |
| (IV) | 0 | 0 |
| (V) | 0 | 0 |
| (VI) | 0 | 0 |

Table 2-Continued

| Compound No. | Killing Ratio (%) Active Ingredient Concentration | |
|---|---|---|
| | 300 ppm | 100 ppm |
| (VII) | 0 | 0 |
| (VIII) | 10 | 0 |
| (IX) | 0 | 0 |
| (X) | 0 | 0 |
| (XI) | 10 | 0 |
| (XII) | 0 | 0 |
| (XIII) | 0 | 0 |
| (XIV) | 0 | 0 |
| Sumithion* (commercially available comparison) | 80 | 10 |

Notes:
(1) The compound number corresponds to that of Table 1.
(2) *Smithion: O,O-dimethyl(3-methyl-4-nitrophenyl) phosphorothioate
(3) Comparison (I)

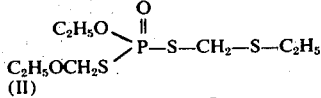
(II)

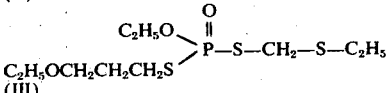
(III)

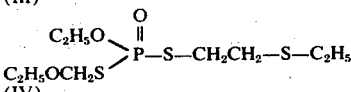
(IV)

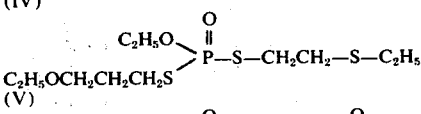
(V)

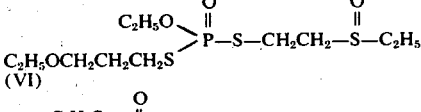
(VI)

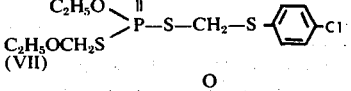
(VII)

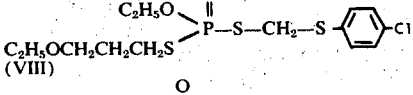
(VIII)

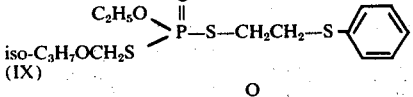
(IX)

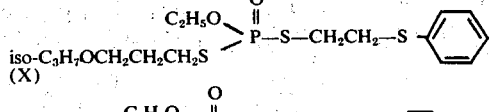
(X)

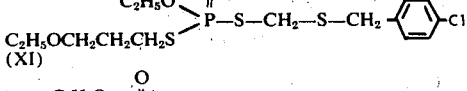
(XI)

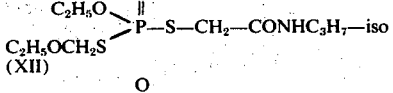
(XII)

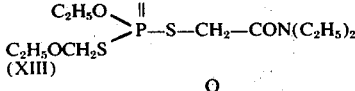
(XIII)

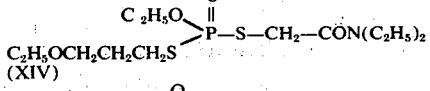
(XIV)

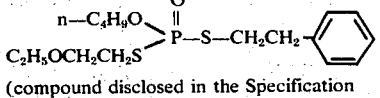
(compound disclosed in the Specification of Dutch Patent No. 67/17383)

EXAMPLE 12

Test on effects against house flies:
Test Procedure

A sheet of filter paper was spread in a Petri dish of 9 cm diameter and 1 ml of an aqueous formulation containing the active compound at the prescribed concentration and prepared in the same manner as in Example 11 was poured into the dish. Then 10 female house-fly imagines were put into the dish and the dish was kept for 24 hours in a thermostat chamber maintained at 28°C. The number of the dead flies was then counted and the killing ratio was calculated. The results are shown in Table 3.

Table 3

| Compound No. | Killing Ratio (%) Active Ingredient Concentration | |
|---|---|---|
| | 1000 ppm | 100 ppm |
| 4 | 100 | 90 |
| 5 | 100 | 100 |
| 6 | 100 | 100 |
| 7 | 100 | 80 |
| 8 | 100 | 100 |
| 9 | 100 | 100 |
| 10 | 100 | 70 |
| 11 | 100 | 70 |
| 13 | 100 | 100 |
| 14 | 100 | 80 |
| 15 | 100 | 80 |
| 22 | 100 | 80 |
| 23 | 100 | 100 |
| 27 | 100 | 80 |
| 31 | 100 | 80 |
| 34 | 100 | 70 |
| 39 | 100 | 90 |

EXAMPLE 13

Test on effects against adzuki bean weevils:
Test Procedure

Ten adzuki bean weevils were soaked for 1 minute in an aqueous formulation containing an active compound at a prescribed concentration and which had been prepared in the same manner as in Example 11, and they were then kept in a thermostat chamber maintained at 28°C. The number of dead weevils was counted after 24 hours had passed and the killing ratio was calculated. The results are shown in Table 4.

Table 4

| Compound No. | Killing Ratio (%) Active ingredient concentration | |
|---|---|---|
| | 1000 ppm | 100 ppm |
| 1 | 100 | 100 |
| 2 | 100 | 100 |
| 8 | 100 | 60 |
| 23 | 100 | 100 |
| 27 | 100 | 60 |
| 31 | 100 | 60 |

EXAMPLE 14

Test on effects against German cockroaches:
Test Procedure

A sheet of filter paper is spread in a Petri dish of 9 cm diameter and 1 ml of an aqueous preparation, containing the active compound at the prescribed concentration and prepared in the same manner as in Example 11, is poured into the dish. Then 10 German cockroach imagines are put into the dish and it is kept for 24 hours in a thermostat chamber maintained at 28°C. The number of dead creatures is counted and the killing ratio is calculated. The results are shown in Table 5.

Table 5

| Compound No. | Killing Ratio (%) Active ingredient concentration 1000 ppm |
|---|---|
| 1 | 100 |
| 2 | 100 |
| 3 | 100 |
| 4 | 100 |
| 5 | 100 |
| 6 | 100 |
| 7 | 100 |
| 8 | 100 |
| 9 | 100 |
| 11 | 100 |
| 13 | 100 |
| 15 | 100 |
| 35 | 100 |

EXAMPLE 15

Test on effects against mosquito larvae:
Test Procedure

An aqueous formulation (100 ml) containing the active compound at the prescribed concentration and prepared in the same manner as in Example 11 was charged into a tall Petri dish having a diameter of 9 cm and a height of 6 cm, and 25 g of fourth-instar mosquito larvae were put into the dish. The dish was kept in a thermostat chamber at 28°C for 24 hours. The number of dead larvae was then counted and the killing ratio was calculated. Results are shown in Table 6.

Table 6

| Compound No. | Killing Ratio (%) Active ingredient concentration 0.1 ppm |
|---|---|
| 11 | 100 |
| 12 | 100 |
| 13 | 100 |
| 16 | 100 |
| 17 | 100 |
| 18 | 100 |
| 20 | 100 |
| 21 | 100 |

EXAMPLE 16

Test on effects against brown planthoppers:
Test Procedure

An aqueous formulation, prepared as in Example 11, and containing the active compound at a prescribed concentration, is sprayed onto 10 cm high rice seedlings planted in a 12 cm diameter pot in an amount of 10 ml per pot. After the sprayed liquor has dried, the pot is covered with a wire gauze cage of 7 cm diameter and 14 cm height into which 30 female mature brown planthoppers are put. The pot is allowed to stand in a thermostat chamber at 28°C for 24 hours and the number of the dead plant-hoppers is counted and the killing ratio is calculated.

Results are shown in Table 7.

Table 7

| Compound No. | Killing Ratio (%) Active ingredient concentration 0.05% |
|---|---|
| 1 | 100 |
| 2 | 95.5 |
| 3 | 100 |
| 4 | 100 |
| 6 | 95.8 |
| 7 | 94.5 |
| 8 | 100 |
| 11 | 100 |
| 12 | 100 |
| 20 | 95.5 |
| 24 | 100 |
| 26 | 85.7 |
| 30 | 97.2 |
| 31 | 100 |
| 33 | 80.8 |
| 36 | 100 |
| 38 | 100 |
| 39 | 100 |
| Malathion (commercially available comparison) | 60.5 |

EXAMPLE 17

Test on effects against two-spotted spider mites:
Test Procedure

A haricot plant having two developing leaves and planted in a 6 cm diameter pot is infected with 50–100 two-spotted spider mite imagines and nymphs which have become resistant to the conventional organophosphates. Two days after the infection, an aqueous formulation, prepared in the same manner as in Example 11, and containing the active compound at a prescribed concentration, is sprayed in an amount of 40 ml per pot. Each pot is kept in a greenhouse for 10 days, and the control effect is evaluated. The evaluation is expressed by the index on the following scale:

Index:
3: No living imago or numph
2: Less than 5% of living imagines and nymphs based on the untreated control
1: 5–50% of living imagines and nymphs based on untreated control
0: more than 50% of living imagines and nymphs based on the untreated control Results are shown in Table 8.

Table 8

| Compound No. | Control Effect Index Active ingredient concentration | | |
|---|---|---|---|
| | 0.1% | 0.03% | 0.01% |
| 1 | 3 | 3 | 1 |
| 2 | 3 | 2 | 1 |
| 3 | 3 | 3 | 1 |
| 4 | 3 | 3 | 1 |
| 5 | 3 | 3 | 3 |
| 6 | 3 | 3 | 3 |
| 7 | 3 | 3 | 3 |
| 8 | 3 | 3 | 3 |
| 9 | 3 | 3 | 3 |
| 10 | 3 | 3 | 2 |
| 11 | 3 | 3 | 3 |
| 12 | 3 | 3 | 2 |
| 13 | 3 | 3 | 3 |
| 14 | 3 | 3 | 3 |
| 15 | 3 | 3 | 3 |
| 16 | 3 | 3 | 3 |

Table 8-Continued

| Compound No. | Control Effect Index Active ingredient concentration | | |
|---|---|---|---|
| | 0.1% | 0.03% | 0.01% |
| 17 | 3 | 3 | 3 |
| 18 | 3 | 3 | 3 |
| 19 | 3 | 3 | 2 |
| 20 | 3 | 3 | 3 |
| 21 | 3 | 3 | 3 |
| 22 | 3 | 3 | 3 |
| 24 | 3 | 3 | 1 |
| 25 | 3 | 3 | 1 |
| 26 | 3 | 3 | 2 |
| 27 | 3 | 3 | 1 |
| 28 | 3 | 3 | 1 |
| 29 | 3 | 3 | 1 |
| 30 | 3 | 3 | 3 |
| 31 | 3 | 3 | 3 |
| 32 | 3 | 3 | 3 |
| 33 | 3 | 3 | 3 |
| 34 | 3 | 2 | 2 |
| 35 | 3 | 3 | 3 |
| 36 | 3 | 3 | 3 |
| 37 | 3 | 3 | 3 |
| 38 | 3 | 3 | 3 |
| 39 | 3 | 3 | 3 |
| Comparison (I) | 2 | 0 | 0 |
| (II) | 2 | 1 | 0 |
| (III) | 2 | 0 | 0 |
| (IV) | 2 | 1 | 0 |
| (V) | 2 | 0 | 0 |
| (VI) | 2 | 0 | 0 |
| (VII) | 2 | 0 | 0 |
| (VIII) | 2 | 0 | 0 |
| (IX) | 1 | 0 | 0 |
| (X) | 2 | 1 | 0 |
| (XI) | 2 | 0 | 0 |
| (XII) | 2 | 0 | 0 |
| (XIII) | 2 | 0 | 0 |
| (XIV) | 1 | 0 | 0 |
| Sappiran* (commercially available comparison) | 3 | 2 | 0 |

Note:
*Sappiran: chlorophenyl chlorobenzene sulfonate.

It will be appreciated that the instant specification and examples are set forth by way of illustration and not limitation, and that various modifications and changes may be made without departing from the spirit and scope of the present invention.

What is claimed is:

1. A compound of the formula $$\begin{array}{c} R^1O \\ R^2OCH_2CH_2S \end{array} \!\! \begin{array}{c} O \\ \parallel \\ P\!-\!S\!-\!R^3 \end{array}$$

in which
$R^1$ is methyl or ethyl,
$R^2$ is lower alkyl of 1 to 4 carbon atoms and $R^3$ is $-C_1-C_6$ Alkyl$-\overset{(O)_n}{\overset{\parallel}{S}}-C_1-C_4$ Alkyl, $-C-C_3$ Alkyl$-\overset{O}{\overset{\parallel}{C}}-OC_2H_5$, $-C_1-C_3$ Alkyl$-\overset{(O)_n}{\overset{\parallel}{S}}-(CH_2)_m-$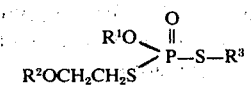$-X$ or $-C_1-C_3$ Alkyl$-\overset{O}{\overset{\parallel}{C}}-N\!\!\begin{array}{c}R_4 \\ R_5\end{array}$ Wherein n is o or 1, x is hydrogen or chloro, R₄ is hydrogen or Alkyl of 1 to 4, R₅ is alkyl of 1 to 4, cyclohexyl or benzyl.

2. A compound according to claim 1 wherein C₁-C₃ alkyl is methyl or ethyl.

3. The compound according to claim 1 wherein such compound is O-ethyl-S-(2-ethoxyethyl)-S-(2-ethylthioethyl)-phosphorodithiolate of the formula

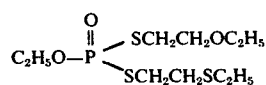   (5)

4. The compound according to claim 1 wherein such compound is O-ethyl-S-(2-isopropoxyethyl)-S-(2-ethylthioethyl)-phosphorodithiolate of the formula

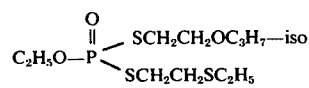   (6)

5. The compound according to claim 1 wherein such compound is O-ethyl-S-(2-ethoxyethyl)-S-(2-n-butylthioethyl)-phosphorodithiolate of the formula

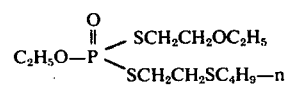   (8)

6. The compound according to claim 1 wherein such compound is O-ethyl-S-(2-ethoxyethyl)-S-(phenylthiomethyl)-phosphorodithiolate of the formula

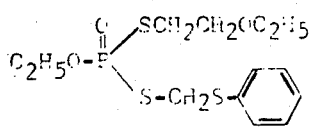   (11)

7. The compound according to claim 1 wherein such compound is O-ethyl-S-(2-ethoxyethyl)-S-(4-chlorophenylthiomethyl)-phosphorodithiolate of the formula

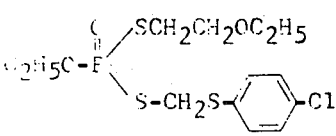   (13)

8. The compound according to claim 1 wherein such compound is O-ethyl-S-(2-ethoxyethyl)-S-dimethylcarbamylmethyl-phosphorodithiolate of the formula

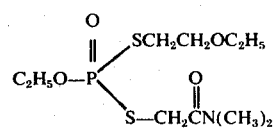   (31)

* * * * *